(12) United States Patent
Kumar

(10) Patent No.: US 6,473,396 B1
(45) Date of Patent: Oct. 29, 2002

(54) USE OF LOGICAL ADDRESSES TO IMPLEMENT MODULE REDUNDANCY

(75) Inventor: Sampath H. Kumar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/226,527

(22) Filed: Jan. 4, 1999

(51) Int. Cl.$^7$ ................................................. H04J 3/14
(52) U.S. Cl. ...................... 370/220; 370/219; 370/216; 370/221; 370/397; 370/399; 709/245; 709/253; 714/4; 714/11; 714/13
(58) Field of Search ................................. 370/216, 220, 370/221, 228, 392, 397, 399, 395.54; 709/245, 253; 714/4, 11, 13

(56) References Cited

U.S. PATENT DOCUMENTS

| | | | | |
|---|---|---|---|---|
| 5,592,611 A | * | 1/1997 | Midgely et al. ................ | 714/4 |
| 5,835,696 A | * | 11/1998 | Hess ............................ | 714/10 |
| 5,936,936 A | * | 8/1999 | Alexander, Jr. et al. ..... | 370/216 |
| 5,974,562 A | * | 10/1999 | Townsend et al. ............. | 714/4 |
| 6,108,300 A | * | 8/2000 | Coile et al. .................. | 370/217 |
| 6,173,312 B1 | * | 1/2001 | Atarashi et al. .............. | 326/81 |

OTHER PUBLICATIONS

N. Aghdaie and Y. Tamir, "Client_transparent Fault–Tolerant Web Server", IEEE May 2001, pp. 209–216.*
M. I. Liechenstein, "File Server System Reliability Versus Level of Inactive and Active Parallel Standby Redundancy". IEEE Apr. 1994, pp. 2482–2485.*
L. Alvisi, T. C. Bressound, A. El–Khashab, K. Marzullo, and D. Zagorodnov, "Wrapping Server–Side TCP to Mask Connection Failures", IEEE INFOCOM Mar. 2001, pp. 329–337.*
M. Y. Luo and C. S. Yang, "Constucting Zero–Loss Web Services", IEEE INFOCOM Mar. 2001, 99 1781–1790.*
P. Chundi, R. Narasimhan, D. J. Rosenkrantz, and S.S Ravi, "Using Active Clients to Minimize Replication in Primary–Backup Protocols", IEEE May 1996, pp. 96–102.*

* cited by examiner

Primary Examiner—Hassan Kizou
Assistant Examiner—Thai Hoang
(74) Attorney, Agent, or Firm—Blakely, Sokoloff, Taylor & Zafman LLP

(57) ABSTRACT

An apparatus is described to implement a module redundant system using logical addresses. The apparatus may comprise a bus on which a plurality of server modules may be coupled to. One of the server modules may be configured to be active and remaining server modules may be configured to be on standby. A plurality of client modules may be coupled to the bus and configured to be in communication with the active server module using logical addresses.

26 Claims, 2 Drawing Sheets

USE OF LOGICAL ADDRESSES TO IMPLEMENT MODULE REDUNDANCY

FIELD OF THE INVENTION

The present invention relates to the use of logical addresses in implementing module redundancy in a networking system.

RELATED ART

Networking is generally a configuration of computers, software and communication devices connected for information interchange. It has become a gateway in which computer processing and electronic communication have merged into one entity. The goal is to process all information including data, voice and image transmission by digital techniques such as asynchronous transfer mode (ATM), frame relay and etc., according to a unified standard such as integrated services digital network (ISDN). By allowing the various computers in a network to transmit and receive information, the pool of information accessible by a computer is far greater than that of a stand-alone computer system. Generally, a networking system may be divided into a number of links. A link may be a local area network (LAN) with each LAN capable of supporting several computers. Where the distance between computers is far apart, that network of computers may be defined as a wide area network (WAN). In a system supporting tens, hundreds or even thousands of computers, complications may arise in that various computers may have their own proprietary computer architectures that do not communicate with each other. A solution to this problem is to move away from proprietary computer architecture to an open system such as open systems interconnection (OSI) standard. By allowing the various computers to adopt the OSI standard, a platform is established in which the various computers may communicate with each other.

An international organization for standardization (ISO) maintains and develops the OSI standard. Generally, OSI architecture is divided into seven layers: the physical layer, the data link layer, the network layer, the transport layer, the session layer, the presentation layer, and the application layer. Further information regarding these layers may be found in Andrew S. Tanenbaum, Computer Networks ($2^{nd}$ ed. 1988, Prentice Hall). Generally, information packets are formed in the higher layers and are passed down to the lower layers until they reach the network layer. In the network layer, headers are added to the information packets and may contain, for example, destination addresses to which the packets are to be sent. The packets are passed to the physical layer which transmits the packets into the networking system. The system, then, forwards the packets link to link until they are retrieved at their destination according to the headers. Depending on the digital technique used, the packets may be frames or cells. Widespread use has been made of the networking system described above. For example, certain entities routinely use these networking systems—telecommunications companies, brokerage firms, banks, large manufacturing companies, electronic commerce companies and so forth. These entities demand highly reliable inter-network connections. Stated differently, a breakdown in the networking system may bring about great economic loss and hardship to the entities using the networking system.

Typically, in an information processing subsystem of the networking system, multiple hardware modules are used to distribute information. One or more of these modules may be responsible for critical functions which need to be available at all times for the proper functioning of the networking system. An example of this module may be a central processing module that segments information into frames or cells and/or reassembles frames or cells into information. An example of a central processing module may be an ATM processing module. The principle behind ATM is to take any received information whether it be data, voice or image, and any speed rate of the information, segment the information into predetermined fixed-length packets (e.g. cells) and attach a header to the individual cells so the each cell may be sent to its destination in the networking system. In the distribution mode, the ATM central processing module processes information into cells and the cells are sent to the various distribution modules to be transmitted over the networking system. Thus, a failure of the ATM processing module generally results in the failure of the link for that portion of the networking system.

To prevent such failure, hardware modules with critical functions, termed server modules, may be supported by one or more hardware redundant modules with similar functionality. Typically, one of the modules, termed active module, is chosen to actively provide the critical functions in a networking system. One or more additional modules with similar functions, termed standby modules, are present as backup for the active module. If the active module fails, the stand-by module detects the failure condition and takes over to become the active module. Modules in inter-module communication with the active module, termed client modules, also may detect the failure. The client modules, once detecting that the previous active module has failed, adjust their addressing modes to communicate with the new active module to resume normal operations.

Generally, the server modules and the client modules may be connected together by means of a variety of network interconnection devices such as buses, switches and so forth. Packets with routing headers that may contain the address of the destination modules may be used for inter-module communication. According to one example, hardware modules are inserted into physical slots where each slot is associated with a physical address. Stated differently, a physical slot has an assigned address which is used by the connected module to identify its location. For inter-module communication purposes, the physical addresses may be used by the modules for transmitting and receiving packets. In the case where the current active server module in a slot has failed, and a standby server module in another slot becomes the new active server module, the client modules need to use the physical address of the slot of the new active server module to transmit and receive packets. This generally involves reprogramming hardware and/or software data structures in the client modules to communicate with the new active server module.

Generally, modules use lookup tables to determine a physical address to which a destination module is associated with. When a new active server module takes over the functions of the previous server module, the client modules need to reprogram their lookup tables to identify the physical address of the new active server module in order to communicate with it. Further, using physical addresses to identify the new active module may generally require the client modules to have the capability of detecting a changeover of the active module and to modify the lookup tables in the hardware and/or software in real time. To implement these features, the clients modules need to be sophisticated and intelligent causing the modules to be expensive. Further, during the changeover to the new active server module, every client module is affected and thus, the system is impaired until the client modules modify their lookup tables to reflect the current active server module.

SUMMARY

An apparatus is described to implement a module redundant system using logical addresses. The apparatus may comprise a bus on which a plurality of server modules may be coupled to. One of the server modules may be configured to be active and remaining server modules may be configured to be on standby. A plurality of client modules may be coupled to the bus and configured to be in communication with the active server module using logical addresses. Other features and advantages of the present invention will be apparent from the accompanying drawings and detailed description to be followed below.

BRIEF DESCRIPTION OF THE DRAWINGS

The present invention is illustrated by way of examples and not as limitations in which the figures of the accompanying drawing, in which like references indicate similar elements, and in which.

DETAILED DESCRIPTION

A method and apparatus is described that uses logical addresses to implement module redundancy system. Typically, in a module redundancy system, modules with critical functions may have one or more standby modules with similar functions that takeover in the event of a failure of the module with critical functions. Typically, physical addresses are used to implement a module redundancy system. According to one example, the physical slots in which the various hardware modules are connected to, are assigned physical addresses to identify the location of the hardware modules. In this system, the modules that communicate with the module with critical functions may need to be intelligent to detect the changeover of a new module that performs the critical functions in the event of a failure. Further, the modules may need to reprogram the hardware and/or software to reflect the new physical address of the new module that provides the critical functions to resume normal operations. By using logical addresses that may be assigned based on the function of the modules, the complicated changeover scheme using physical addresses may be obviated.

Figure 1:
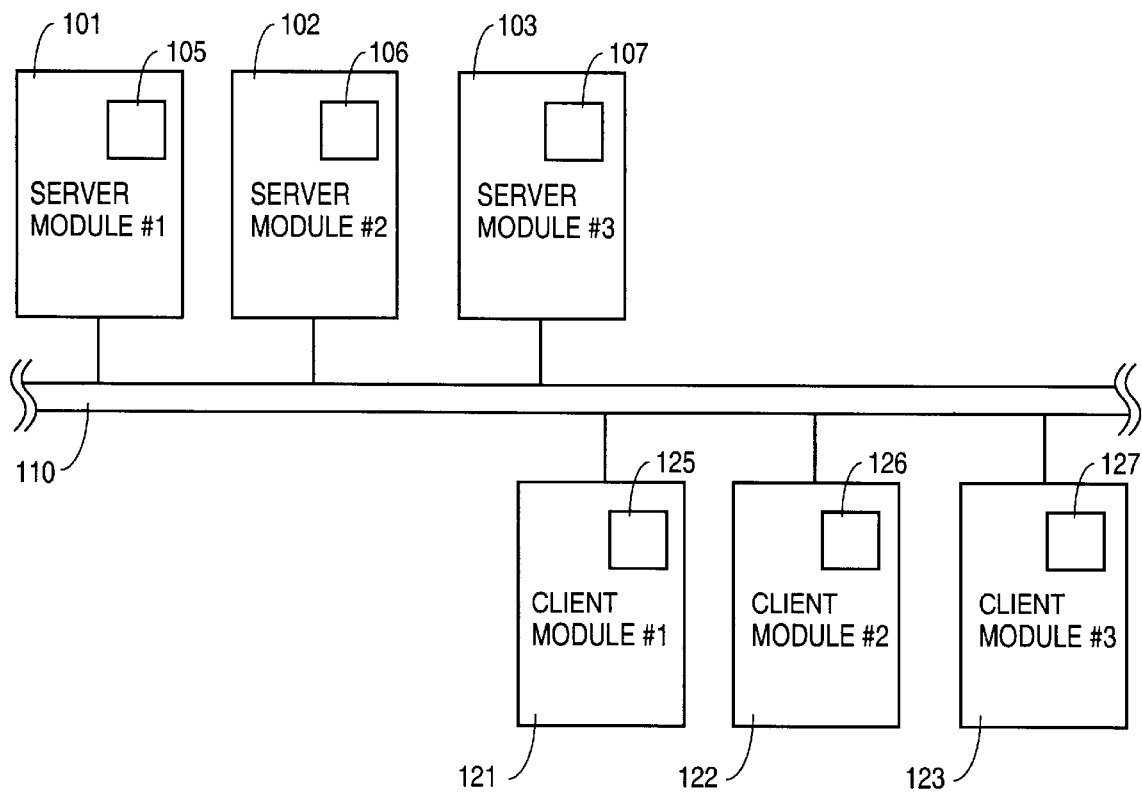
FIG. 1 is a diagram of a system comprising a plurality of server modules and client modules in which an embodiment of the invention may be implemented.

FIG. 1 is an example of a system in which an embodiment of the invention may be implemented. The system may comprise a plurality of server modules 101, 102, 103 that is capable of providing critical functions within a networking system and may be coupled to a bus 110. An example of such server module may be a central processing module (CPM) that segments information into packets for distribution within the networking system and/or reassembles packets into information to be used by a destination computer (not shown), for example. Examples of packets are "frames" and "cells" which may be used in integrated services digital network (ISDN) protocol. While a plurality of server modules 101, 102,103 may be coupled to the bus 110, one server module 101 may be active to segment and/or reassemble packets. The remaining server modules 102, 103 may be redundant modules that are used as standby modules for the active module 101. According to one embodiment, server modules 101,102, 103 may further include a lookup table 105, 106, 107 that may contain physical addresses of modules that the server modules may be in communication with. Further coupled to the bus 110 may be a plurality of client modules 121, 122, 123. In one example, client modules 121, 122, 123 may be serial data modules (SDMs) that may receive packets from the active server module 101 to transmit into the networking system. Additionally, the SDMs may receive packets from the networking system to transmit to the active server module 101.

In one example, the plurality of server modules 101, 102, 103 and the client modules 121, 122, 123 may be contained within a chassis and connected together by a backplane. Within the backplane may be a plurality of slots in which the various modules may be connected to. Each slot has an assigned physical address which may be used by the connected module. Stated differently, the physical address of the slot identifies the location of the connected module and thus, the physical address may be used in a header of a packet which is destined for the module. For example, in the case of an ATM-like cellbus backplane, cells are sent from one module to another using logical channels identified by virtual path/virtual circuit (VP/VC) addresses. These addresses are used by the cellbus interface hardware to lookup tables to get the proper cellheader which contains the physical address of the destination module. Generally, a lookup table contains a mapping of VP/VC addresses of the logical channels to the physical addresses of the various modules. The lookup table may be used by a module to lookup an address of the destination module.

Turning to the multiple server modules 101, 102, 103, as described above, one server module 101 may be active at one time. For redundancy purposes, many methods may be used for providing communication between the active server module 101 and the standby server modules 102, 103. In one method, the active server module 101 may at fixed intervals, send a packet through the bus 110 to the standby modules 102, 103 at their physical addresses to indicate that it is functioning. In one example, the active server module 101 may send a packet to one of the standby modules 102. In the event the standby module 102 does not receive a packet from the active server module 101 within a predetermined period of time, the standby module 102 activates to become the new active server module. Once activated, the new active server module 102 may take over the functions of the previous server module 101 and may start to send packets at fixed intervals to the next standby module 103 at its physical address to indicate that it is functioning. In another method, the standby module 102 may at fixed intervals, send a packet to the active server module 101 at its physical address through the bus 110. In the event the standby module 102 does not receive an acknowledgment from the active server module 101 within a predetermined period of time, the standby module 102 activates to become the active server module.

According to another method, packets sent by the client modules 121, 122, 123 to the active server module 101 are also routed by the active server module 101 to one of the standby modules 102. However, only the active server module 101 processes the received packets. As for the standby module 102, the received packets may be stored in a buffer on a first in first out basis. As the buffer overflows, the earlier received packets are purged. In the event the standby module 102 does not receive packets from the active server module 101 within a predetermined period of time, the standby module 102 may send a packet to the active server module 101 to determine its functionality. If the active server module 101 does not respond within a period of time, the standby module 102 activates to become the active server module. In this instance, because the new active server module already has packets transmitted by the client modules 121, 122, 123 previously, the new active server module may operate with little or no loss in information.

Turning now to the plurality of client modules 121, 122, 123, in one example, client modules 121, 122, 123 may receive packets from the active server module 101 to transmit the packets into the networking system. Additionally, client modules 121, 122, 123 may receive packets from the networking system and transmit the packets to the active server module 101. According to one example, the client modules 121, 122, 123 may identify the location of the active server module 101 by using a lookup table 125, 126, 127 which contains the physical address of the active server module 101. In the event where the current active server module 101 has failed, and the role is assumed by the standby module 102, client modules 121, 122, 123 need to detect the changeover of the active server module so that communication can be established with the new active server module. Typically, this involves the client boards 121, 122, 123 reprogramming their lookup tables 125, 126, 127 to establish the physical address of the new active server module. Generally, the detection of the changeover of the active server module and the reprogramming of the lookup tables involves a complicated process.

In one method, a lookup table may be made common to all the connected client modules 121, 122, 123. In this instance, a client module that detects a new current active server module may change the lookup table to reflect the physical address of the new active server module. In one example, an echo back protocol may be implemented in which a signal is sent back to the transmitting module if the transmitted packet is received at the destination module. Thus, if the client module 121, after a predetermined number of attempts, is not able to transmit a packet to the active server module 101, may reprogram the lookup table 125 to reflect the physical address of a predetermined standby module 102 to be the new active server module. Once changed, the client module 121 may send a packet to the new physical address. If the packet is accepted and acknowledged, the client module 121 will recognize that a changeover had taken place. In the case where each client module 121, 122, 123 has its own individual lookup tables 125, 126, 127, a communication protocol may be established between the client modules 121, 122, 123 where if one client module 121 detects a changeover, this information is conveyed to the remaining client modules 122, 123.

In another method, once the standby module 102 becomes the new active server module, the new active server module accesses its lookup table 106 and determines all the physical addresses of the client modules 121, 122, 123 connected to previous server module 101. The lookup tables 105, 106, 107 of the various server modules 101, 102, 103 may contain similar information. The new server module 102 may send to the connected client modules 121, 122, 123 a broadcast to announce that a changeover had taken place. Once the individual client modules 121, 122, 123 receive the broadcast, the client boards 121, 122, 123 may access their associated lookup tables 125, 126, 127 and reprogram the contents to reflect the changeover.

In accordance with an embodiment of the present invention, the complicated process of the client modules detecting the changeover to a new active server module and changing the hardware and/or software accordingly may be obviated by using logical addressing scheme instead of a physical addressing scheme. As described above, physical addresses are assigned based on their physical location, for example, a slot in which a module may be connected to. Logical address, on the other hand, may be assigned to modules based on their functions. Stated differently, a particular logical address may be associated with the function the module may be performing and not with the physical location of the module. This implementation is described below.

Figure 2:
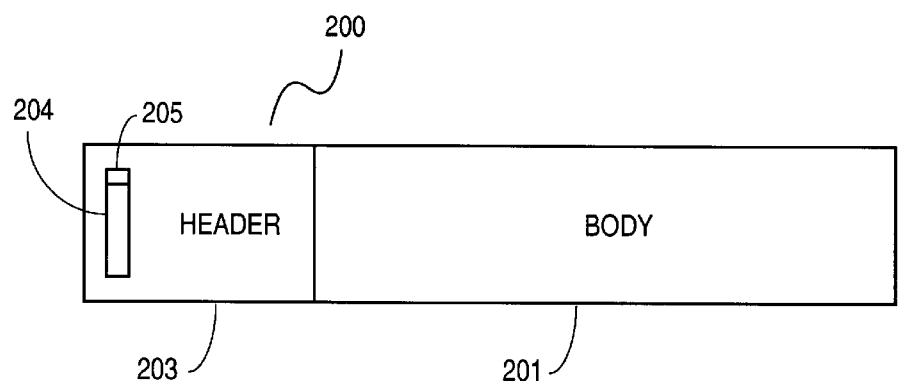
FIG. 2 is a diagram of a packet according to an embodiment of the invention.

FIG. 2 is an example of a packet 200 that may be used in inter-module communication. The packet may comprise a body 201 containing quantified piece of information and a header 203 including a destination address field 204. According to one example, the destination address field 204 may comprise eight bits in which the most significant bit (MSB) 205 may be reserved to distinguish between a physical address and a logical address. For example, if the MSB 205 is logical 0, the address is a physical address. If the MSB 205 is logical 1, the address is a logical address. In an eight bit destination address field 204 with MSB 205 being used as a address type indicator, 128 address may be reserved for physical addresses and 128 addresses may be reserved for logical addresses. If more addresses are required, the number of bits in the destination address field 204 may be increased. In one embodiment, server modules 101, 102, 103 may be configured to distinguish between a physical address and a logical address using the MSB 205. According to the embodiment, server module made active is configured to receive packets with destination addresses that are both physical and logical, whereas server modules on standby is configured to receive packets with physical addresses. Under the configuration, communication between server modules 101, 102, 103 may be performed using physical addresses. Communication from the active server module 101 to the client modules 121, 122, 123 may be performed using physical addresses and communication from the client modules 121, 122, 123 to the active server module 101 may be performed using logical addresses. The client modules 121, 122, 123 communicate with the active server module 101 using logical addresses while the standby modules 102, 103 remain unresponsive to the logical addresses until such time one of the modules become activated to take over the role of active server module. Once activated, the standby module that assumes the role of the active server module is configured to receive packets with destination addresses that are both physical and logical. Alternative methods of communication with logical and/or physical addresses may be used.

Figure 3:
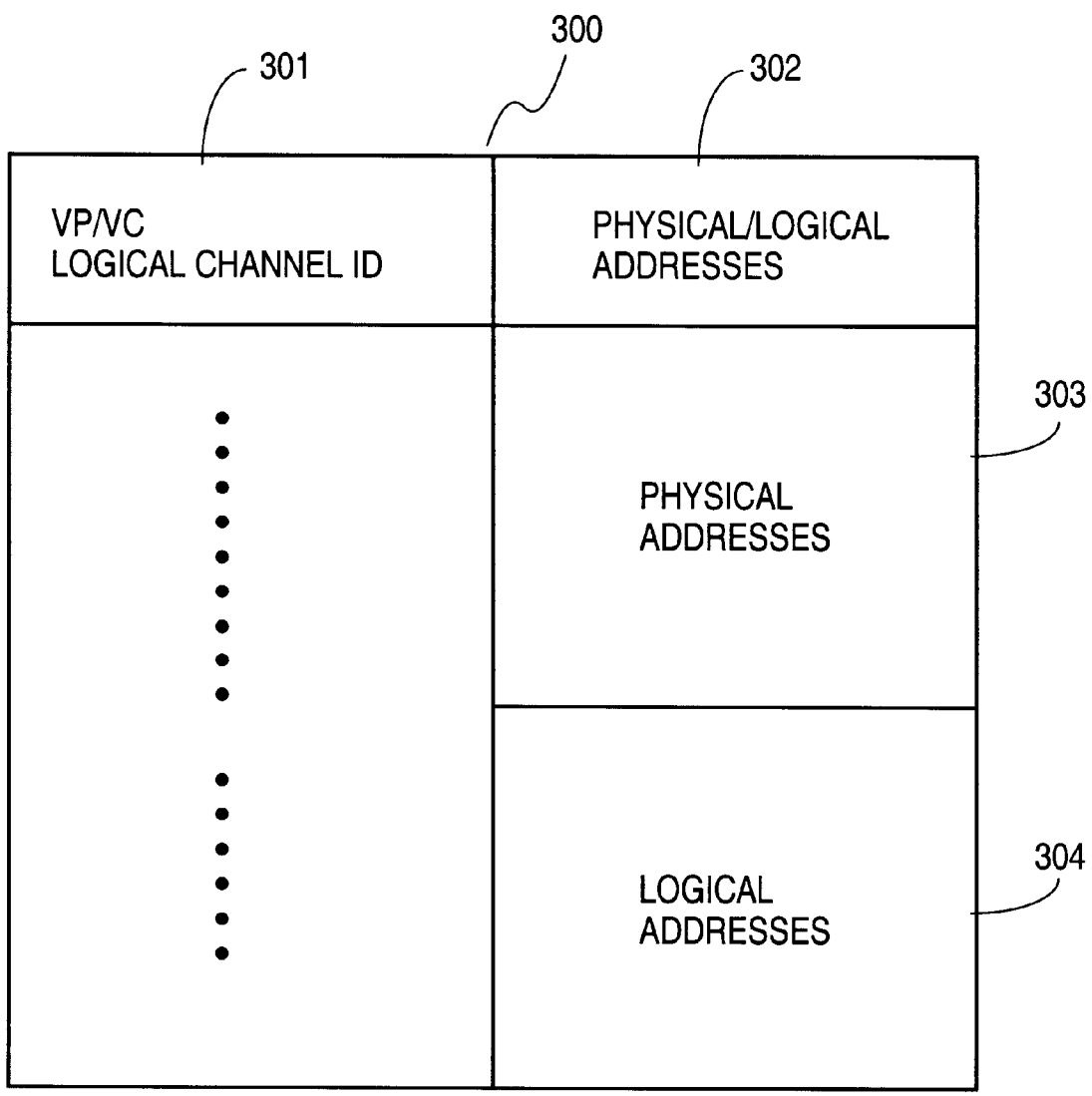
FIG. 3 is a diagram of a lookup table according to an embodiment of the invention.

FIG. 3 is an example of a lookup table 300 that may be used by the client modules 121, 122, 123. The lookup table 300 may be divided into two separate columns 301, 302. Using ATM-like cellbus backplane as an example, column 301 of the lookup table 300 may contain a list of VP/VC addresses that may be received by the client modules 121, 122, 123. Column 302 may be further divided into a physical address section 303 and a logical address section 304. Translation of addresses between column 301 and column 302 of the lookup table may be performed. According to one embodiment, the client modules 121, 122, 123 may translate received VP/VC addresses into the corresponding logical addresses using the lookup table. For example, when the client module 121, 122, 123 receives a packet with VP/VC address from the networking system, client module 121, 122, 123 refers to the lookup table 125, 126, 127 to determine the associated logical address which is to be used in a header of the packet 200 (see FIG. 2). With the logical address in the header, client module 121, 122, 123 loads the packet 200 into the bus 110 (see FIG. 1) for transmission. The logical address is based on the destination module's function. Thus, for example, where the received packets of the client module requires the packets to be reassembled into information, the header of the packets will contain the logical address of the module that performs the function. As the packets are transmitted in the bus 110, the active server module 101 coupled to bus 110 detects the logical address and receives the packets. Because the logical address is assigned based on performed function, the logical address is common to all the server modules 101, 102, 103, standby or active, that are coupled to the bus 110, but enabled on the active server module. When there is a failure of the active server module 101, the standby module 102 assumes the role of the active server module and receives packets that use the same logical addresses of the previous active server module. Thus, the client modules 121, 122, 123 may continue to communicate with the new active server module without modifying their existing hardware and/or software structure. Note that because a logical address is based on a function, where a module has multiple functions, the module may have multiple logical addresses. Further, because there is no need for the client modules 121, 122, 123 to detect changeover of the active module and to modify the lookup tables in the hardware and/or software in real time, the client modules need not be sophisticated and intelligent. The lookup table may be coded in a read only memory (ROM), for example, because there is no need for the clients modules 121, 122, 123 to reprogram their respective lookup tables.

Turning now to the server modules 101, 102, 103, standby modules 102, 103 may be configured to detect a failure of the active server module 101. In one example, a separate line may be used to connect the server modules together. Using the line, a signal may be sent at fixed intervals by a designated standby module to the active server module. If the standby module does not receive an acknowledgment signal, the standby module activates to become the new active server module. Once activated, the new active server module may designate one of the standby modules to transmit a signal at fixed intervals to determine if the new active server module is functioning. In another example, the server modules have the capability to receive packets with both logical addresses and physical addresses. Detection of the failed active server module may be determined by standby modules using the various methods described above using physical addresses.

In the foregoing specification, the invention has been described with reference to exemplary embodiments thereof. It will, however, be evident that various modifications and changes can be made thereto without departing from the broader spirit and scope of the invention as set forth in the appended claims. The specification and drawings are accordingly, to be regarded in an illustrative rather than a restrictive sense.

What is claimed is:

1. An apparatus, comprising:
   a bus;
   a plurality of server modules coupled to said bus, one of said server modules configured to be active and each remaining server module configured to be on standby; and
   a plurality of client modules coupled to said bus that direct information to said active server module by including with said information a logical address that is based upon a function performed by said active server module.

2. The apparatus of claim 1, wherein at least one of said client modules further comprises a lookup table that correlates a VP/VC address to said logical address.

3. The apparatus of claim 1 wherein, after a said remaining server module is converted from standby to active because said active server has ceased to function properly, said converted server accepts further information from said client modules based upon said logical address.

4. The apparatus of claim 1 wherein said information is sent in the form of a packet having a header, said header further comprising:
   1) an address; and
   2) an indication whether said address is a logical address or a physical address.

5. The apparatus of claim 4, wherein said indication is represented with a single bit within said header.

6. The apparatus of claim 1, wherein said active server module directs a communication to at least one of said remaining server modules configured to be on standby by including with said communication a physical address that is based upon a physical location of said standby server module that is to receive said communication.

7. The apparatus of claim 1, wherein said active server module directs a communication to at least one of said remaining server modules configured to be on standby over a separate line that is not a part of said bus.

8. The apparatus of claim 1, wherein said active server module is configured to detect a physical address and a logical address, and said remaining server modules configured to be on standby configured to detect said physical address.

9. An apparatus, comprising
   a plurality of client modules that are coupled to an active server module through a bus so that said client modules can send information to said active server module, said active server configured to perform a function upon said information, said information having a destination address is a logical address, said logical address based upon said function performed by said active server, said apparatus further comprising at least one standby server module that becomes a new active server module so as to perform said function in place of said active server if said active server module fails.

10. The apparatus of claim 9 wherein, so long as said standby server module does not become said new active server, said standby server does not perform said function on said information because said information has said logical address.

11. The apparatus of claim 10 wherein, as part of standby server module transitioning to said new active server module, said new active server module begins to perform said function on said information because said information has said logical address.

12. The apparatus of claim 9 wherein said active server module directs at least one communication to said standby server module by including in said communication a second destination address that causes said communication to be received by said standby server module because said second destination address is a physical address based upon a physical location of said standby server module.

13. The apparatus of claim 12 wherein said communication helps said standby server module recognize whether or not said active server module has failed.

14. The apparatus of claim 9 wherein said active standby module directs at least one communication to said active server module by including in said communication a second destination address that causes said communication to be received by said active server module because said second destination address is a physical address that is based upon a physical location of said active server module.

15. The apparatus of claim 14 wherein a response to said communication by said active server module, or lack thereof, helps said standby server module recognize whether or not said active server module has failed.

16. The apparatus of claim 9 wherein said active server module sends additional information to a first of said client modules, said additional information having a destination address, said destination address being a physical address that is based upon a physical location of said first client module.

17. An apparatus, comprising:
  a) means for sending information from a client server module to an active server module, said information having a destination address that is based upon a function that is performed by said active server module on said information;
  b) means for communicating between said active server module and one or more standby server modules that can replace said active server module so as to perform said function if said active server module fails, said communicating for recognizing whether or not said active server module has failed, said communicating including a second destination address, said second destination address being a physical address that is based upon a physical location of a server module that is at the receiving end of said communicating.

18. The apparatus of claim 17 wherein said means for sending information further comprises a bus.

19. The apparatus of claim 18 wherein said means for communicating further comprises said bus.

20. The apparatus of claim 18 wherein said means for communicating further comprised a separate signal line that is not a part of said bus.

21. A method, comprising:
  a) sending information from a client module to an active server module, said active server module configured to perform a function on said information, said information having a destination address, said destination address being a logical address that is based upon said function;
  b) performing said function on said information;
  c) recognizing that said active server has failed; and
  d) sending more information from said client module to a new active server module that performs said function, said new active server having transitioned from a standby server in response to said recognizing that said active server has failed, said more information having said destination address.

22. The method of claim 21 further comprising communicating between said active server module and standby server module, prior to said recognizing that said active server module server has failed, said communicating including a second destination address, said second destination address being a physical address that is based upon a physical location of a server module that is at the receiving end of said communicating.

23. The method of claim 22 wherein said communicating further comprises said active server sending separate communications to said standby server module at fixed time intervals.

24. The method of claim 22 wherein said communicating further comprises said standby server module sending separate communications to said active server module at fixed time intervals.

25. The method of claim 21 wherein said standby server, prior to said recognizing that said active server has failed, stores said information in a buffer on a first-in first-out basis until said buffer overflows such that the earliest of said information is purged.

26. The method of claim 21 further comprising sending, prior to said recognizing that said active server has failed, additional information from said active server module to said client module, said sending including a second destination address, said second destination address being a physical address that is based upon a physical location of a client module.

* * * * *